United States Patent [19]

Burtea

[11] Patent Number: 4,576,090

[45] Date of Patent: * Mar. 18, 1986

[54] TUNNEL HEATER

[75] Inventor: Constantin Burtea, Melrose Park, Ill.

[73] Assignee: Mastermatic, Inc., Chicago, Ill.

[ * ] Notice: The portion of the term of this patent subsequent to Sep. 18, 2001 has been disclaimed.

[21] Appl. No.: 606,138

[22] Filed: May 2, 1984

Related U.S. Application Data

[63] Continuation-in-part of Ser. No. 379,738, May 19, 1982, Pat. No. 4,471,750.

[51] Int. Cl.[4] .......................... A23L 3/00; A21B 1/00
[52] U.S. Cl. .................................. 99/443 C; 99/476; 99/477; 126/21 A; 126/39 D
[58] Field of Search ............... 126/39 D, 39 K, 19 R, 126/21 R, 21 A; 99/477, 474, 476, 360, 443 R, 443 C

[56] References Cited

U.S. PATENT DOCUMENTS

| | | | |
|---|---|---|---|
| 3,908,533 | 9/1975 | Fagerstrom | 99/443 C |
| 4,252,055 | 2/1981 | Johansson | 99/443 C |
| 4,471,750 | 9/1984 | Burtea | 126/21 A |

FOREIGN PATENT DOCUMENTS 77855 3/1955 Netherlands ...................... 99/443 C Primary Examiner—William E. Lyddane
Assistant Examiner—Gerald A. Anderson
Attorney, Agent, or Firm—LeBlanc, Nolan, Shur & Nies

[57] ABSTRACT

An improved apparatus and method for heating food products by forced air convection are disclosed. The apparatus comprises a tunnel heater having a tunnel-like cavity through which food products to be heated are conveyed. Air is drawn from within the tunnel cavity by a circulating blower arrangement, with air flow directed against the food products through upper and lower foraminous plates disposed above and below and adjacent to the tunnel cavity. Aerodynamically efficient ducting of the circulating air is provided by scroll-shaped passages positioned in association with the blower arrangement, and venturi-like passages positioned upstream of the foraminous upper and lower plates. A conveyor is provided for automatically advancing food products through the tunnel cavity. Air curtains are provided at either end of conveyor to isolate the cavity so that heating of the food products takes place in an efficient and controlled manner.

11 Claims, 11 Drawing Figures

TUNNEL HEATER

This application is a continuation-in-part of my co-pending patent application Ser. No. 379,738, filed May 19, 1982, now patent number 4,471,750.

Technical Field

The present invention relates generally to arrangements for heating food products, and more particularly to an improved tunnel heater apparatus and method for heating food products by convection.

BACKGROUND OF THE INVENTION

In the restaurant and food service industry, one of the primary considerations in providing efficient food preparation and service is the manner in which food products are to be cooked or otherwise heated. To this end, many establishments employ commercially-sized ovens and like devices which heat food in a conventional manner by placing the food within the heated oven chamber.

While such cooking arrangements are in widespread use, such use is not without certain inherent drawbacks. For example, typical commercial ovens are generally designed to be continuously switched on, that is, the oven is heated to its normal operating temperature at the start of business hours and left to operate continuously throughout the business day. Unfortunately, this can detract from efficient operation of the unit since many restaurant establishments experience peaks in their business only during certain times while they are open, such as at meal times. Thus, there are periods during which the oven is switched on and ready for use when there is little or no business.

Further, the chamber of most typical commercial ovens is only accessible from one side, usually through a hinged door or the like. This not only mandates that the oven be repeatedly opened and closed for removing cooked products from the oven or for placing food products to be cooked into the oven, but also detracts from convenient use of the oven since individual orders being prepared in the oven can sometimes be mixed-up. Naturally, this detracts from efficient food preparation, and may result in customer dissatisfaction.

A further drawback associated with the typical commercial oven relates to the manner in which the oven cooks or heats food. While the normal baking process by which a conventional oven cooks is well established as providing acceptable results, the period of time required for the required cooking or heating may be unacceptably long for some food service establishments. This is especially true for fast food restaurants and the like in which a premium is placed upon quick and efficient preparation of food products. In this regard, arrangements for heating food by forced air convection have been recognized as desirable for reducing food preparation time.

Thus, the introduction of an apparatus for heating food products which overcomes many of the inherent limitations associated with conventional oven arrangements, and which is readily suited for use in commercial restaurant establishments and the like, is desirable for providing efficient, economical preparation of food products.

SUMMARY OF THE INVENTION

In accordance with the present invention, an apparatus and method for heating food products are disclosed which facilitate efficient preparation and service of food products. The apparatus comprises a generally open-ended tunnel heater through which food products to be heated are conveyed. The heater includes a novel arrangement for heating and circulating air in a highly efficient manner within the heater, and for directing the heated air against the food products conveyed therethrough.

The present tunnel heater apparatus includes a heater housing having a tunnel-like cavity extending throughout its length, the cavity being adapted to receive food products to be heated. In the preferred embodiment, conveying means are provided which extend the length of the cavity in the housing for supporting and conveying food products through the heater so that the products are received by one end of the cavity and discharged from the other end.

The apparatus further includes upper and lower foraminous plates which are disposed within the heater housing above and below the tunnel-like cavity. Each plate is flat and relatively thin, and includes a plurality of holes extending therethrough through which air is directed against food products in the cavity. Preferably, each plate includes adjacent perforate and imperforate portions so that food products being heated are conveyed through non-discrete zones of relatively high and relatively low convective heating.

In order to circulate air within the heater housing through the foraminous plates, centrifugal blower means are provided for drawing air from the heater cavity. In the preferred embodiment, a pair of centrifugal blowers are provided, each run by its own electric motor.

As circulating air is drawn from within the heater cavity into the centrifugal blowers, the air passes through a heating chamber in which the air is selectively heated. A thermostatically controlled burner positioned within the heating chamber heats the circulated air to an elevated temperature so that food products conveyed through the heater cavity are heated by convection.

In order to enhance efficient circulation of air within the heater, the apparatus includes a novel duct work arrangement which has been found to facilitate air flow. Aerodynamically efficient duct means are associated with the air circulating blowers for enhancing air flow and delivery from the blowers to the foraminous upper and lower plates positioned above and below the heater cavity. In the presently preferred embodiment, the duct means define a pair of opposed scroll-shaped passages around each of the blowers of the heater, and further define venturi-like passages disposed immediately upstream of the foraminous plates for creating a relative increase in the pressure of the circulated air before passage through the upper and lower plates. The duct work further includes arcuate-shaped air flow guides which are positioned within the scroll-shaped passages for guiding the flow of circulated air transversely of the scroll-shaped passages to the venturi-like passages downstream thereof. This unique arrangement of the duct work of the present heater apparatus has been found to promote efficient air flow so that food products are heated quickly and efficiently.

In order to further promote efficient operation, the present tunnel heater includes a plurality of supports which support the duct work of the heater within the heater housing. Each of the supports includes a portion of reduced cross-section so that conductive heat transfer from the heater duct work to outer portions of the heater housing is minimized. This duct-supporting arrangement, together with the use of suitable thermally insulating materials, has been found to promote energy efficiency, an important consideration in a commercially-sized cooking device.

In a preferred embodiment air curtains are provided at each end of the tunnel-like cavity to keep the circulating heated air within the housing and to keep unheated ambient air from being drawn into the cavity. Slots, preferably equipped with means for directing flow therethrough, are provided in the upper and lower foraminous plates so that air from the centrifugal blower means expelled through the slots forms the curtains. The slots extend lengthwise across the opening for receiving products to be cooked and the opening for discharging cooked products. Air curtains substantially improve fuel consumption and reduce ambient air temperature in the kitchen.

It will be appreciated that the present tunnel heater obviates many of the problems associated with typical large-sized ovens heretofore commonly used in commercial food preparation. The tunnel-like configuration of the heater, together with the use of an automatic conveying apparatus for food products to be heated, assures systematic and convenient filling of food orders. Additionally, the convection method by which the present heater cooks or otherwise heats food has been found to provide much shorter cooking times than required with use of conventional ovens. Further, the highly efficient nature of the present tunnel heater apparatus permits the arrangement to be brought up to operating temperatures in a relatively short time, thus precluding the need for the apparatus to be maintained in a fully operational state during periods in which maximum output is not required.

Numerous other advantages and features of the present invention will become readily apparent from the following detailed description of the invention and embodiments thereof, from the claims and the accompanying drawings in which like numerals are employed to designate like parts throughout the same.

DETAILED DESCRIPTION

Figure 1:
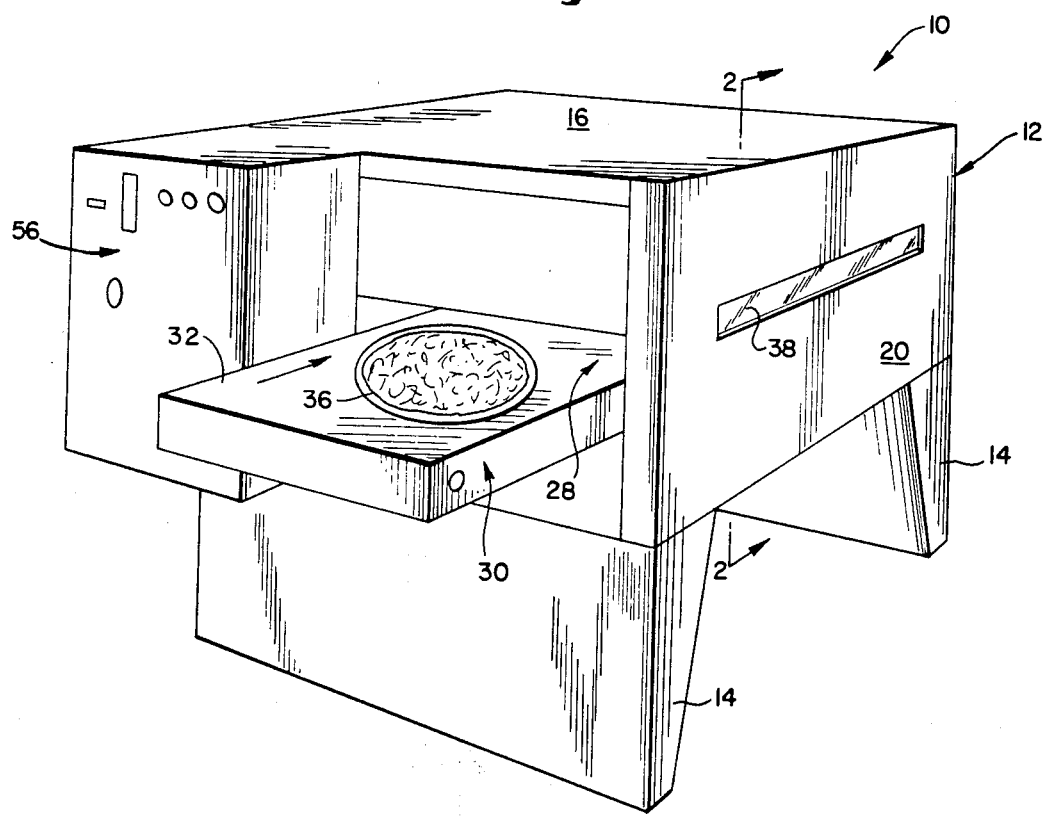
FIG. 1 is a perspective view of the tunnel heater of the present invention.

While the present invention is susceptible to embodiment in various forms, there is shown in the drawings and will hereinafter be described presently preferred and alternate embodiments with the understanding that the present disclosure is to be considered as an exemplification of the invention and is not intended to limit the invention to the specific embodiment illustrated.

With reference now to the FIGS. 1–6, therein is illustrated the present preferred embodiment of tunnel heater 10 of the present invention. As described, heater 10 is arranged to cook or otherwise heat food products by forced hot air convection, and includes a food product conveying arrangement so that food products to be heated may be automatically moved through the heater for cooking.

Tunnel heater 10 includes a generally box-like heater housing 12 supported upon legs 14. Notably, heater 10 is designed so that one heater can be stacked upon another, which is particularly useful where space is somewhat limited. Heater housing 12 includes an outer upper wall 16 and an outer lower wall 18. The housing further includes spaced outer side walls 20 and 22, and spaced outer end walls 24 and 26. Each of end walls 24 and 26 defines an opening at the respective ends of a tunnel-like cavity 28 which extends the length of heater 10.

Cavity 28 is adapted to receive food products to be heated, and to this end a conveyor 30 is provided which extends the length of cavity 28 and beyond the ends thereof. Conveyor 30 includes an upper conveyor run 32 and a lower, return conveyor run 34 so that food products, such as 36, may be placed upon the upper conveyor run 32 and advanced through tunnel cavity 28 of the heater. In this manner, food products are received through one end of cavity 28, moved through the cavity on conveyor 30, and discharged from the conveyor at the other end of cavity 28. Conveyor 30 is preferably provided with a variable speed control so that heating times of food products conveyed can be selectively varied. If desired, outer side wall 20 of the heater housing 12 may be provided with an elongated observation window 38 so that food products being conveyed through the heater may be readily inspected. Window 38 may be provided with sliding glass doors or the like to permit ready access to tunnel cavity 28 intermediate the ends thereof.

Figure 2:
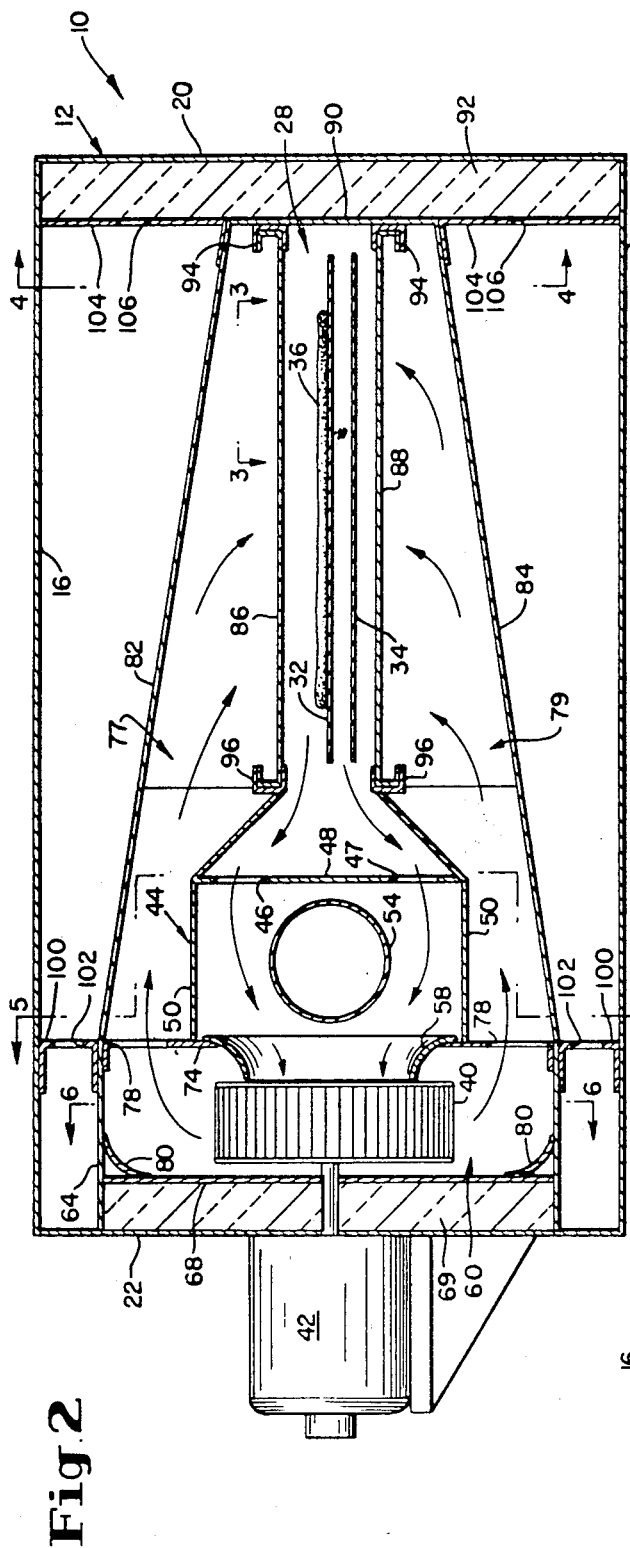
FIG. 2 is a cross-sectional view of the present tunnel heater taken along lines 2—2 of FIG. 1.
Figure 4:
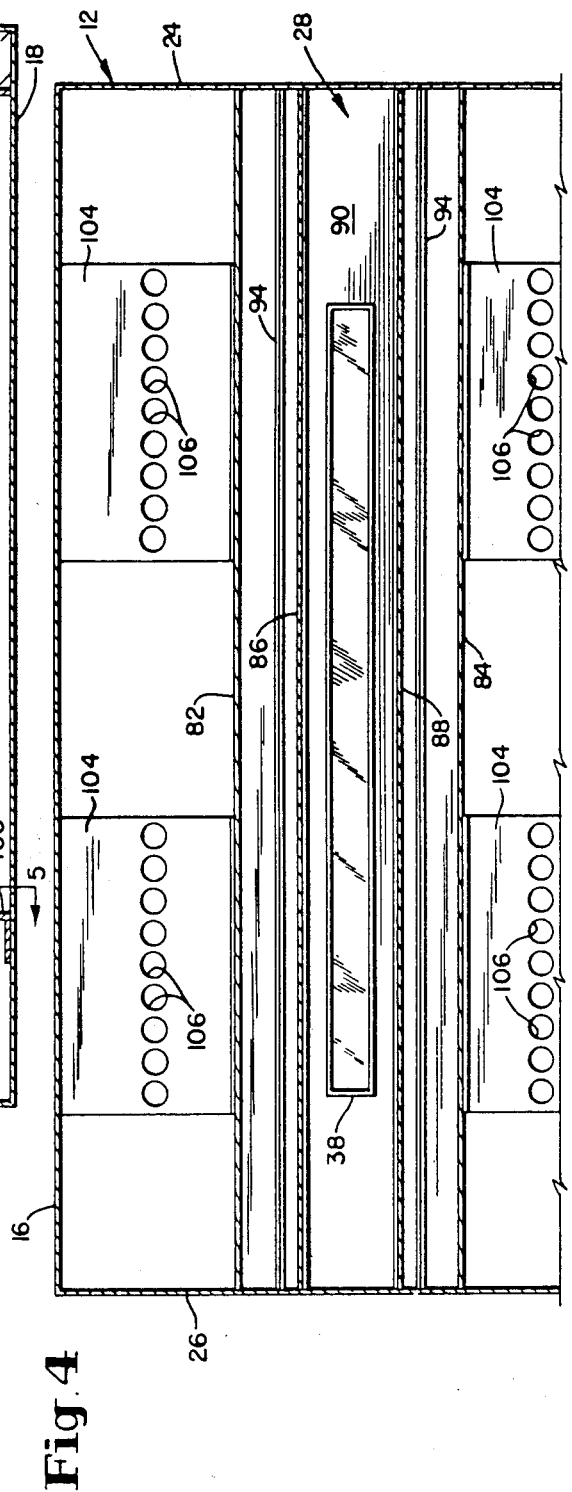
FIG. 4 is a fragmentary cross-sectiona view taken generally along lines 4—4 of FIG. 2.
Figure 5:
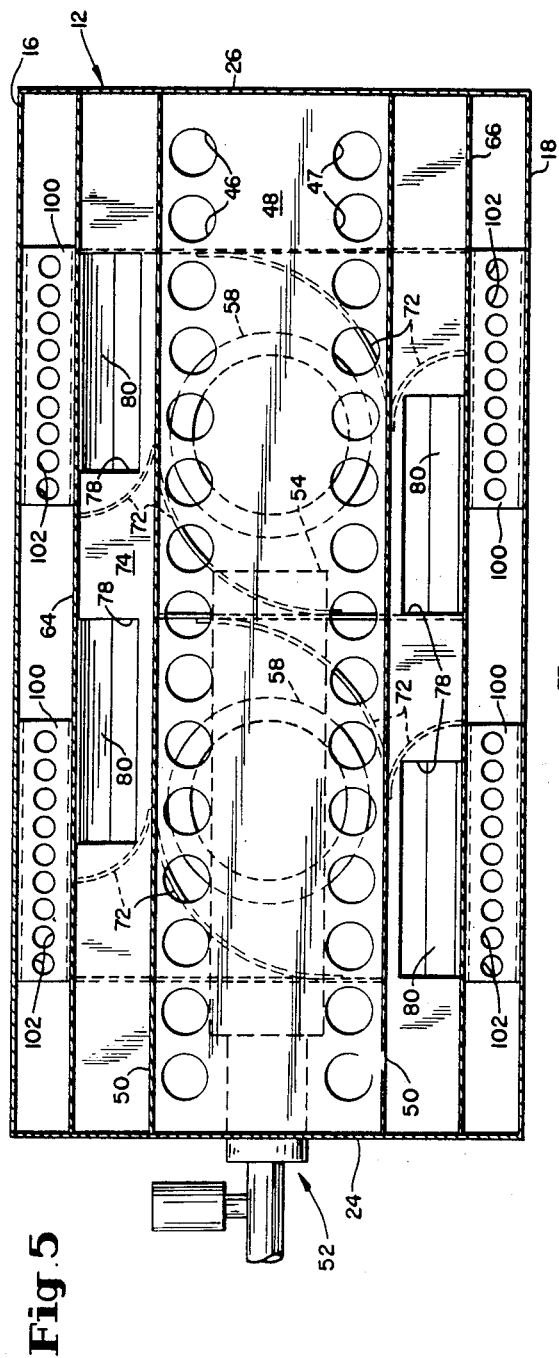
FIG. 5 is a a cross-sectional view taken generally along lines 5—5 of FIG. 2.
Figure 6:
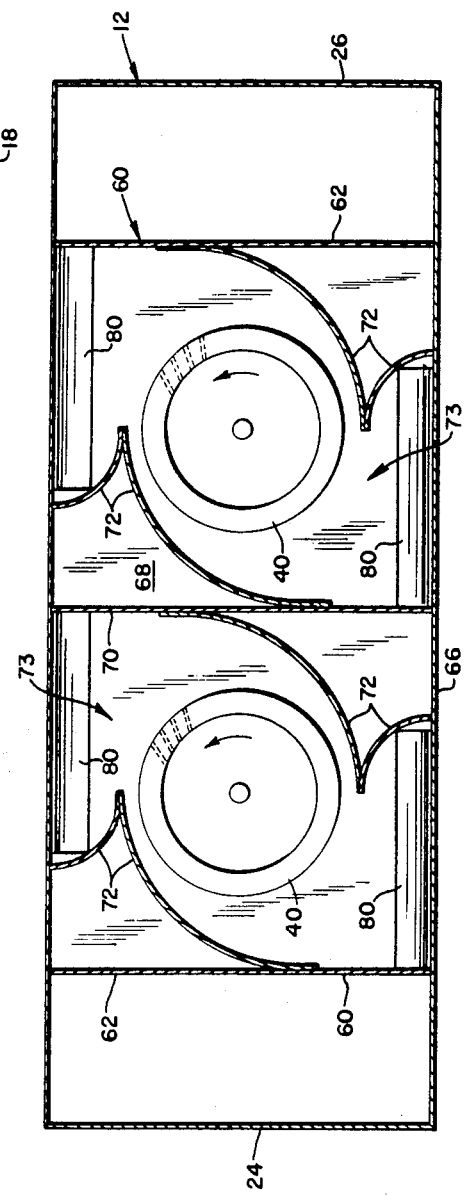
FIG. 6 is a partial cross-sectional view taken generally along lines 6—6 of FIG. 2.

In order to heat food products conveyed through tunnel cavity 28 on conveyor 30, tunnel heater 10 provides for circulation of heated air within the heater housing 12 so that the heated air is directed against the upper and lower surfaces of food products conveyed through the heater. To provide circulation of air in this manner, a pair of centrifugal blowers 40 is provided for drawing air from within cavity 28, although a single blower or more than two blowers could of course be used. Each blower 40 is provided with its own electric motor 42, with the blowers 40 arranged so that air drawn from cavity 28 is drawn into heating chamber 44 through a plurality of upper and lower intake holes 46 and 47 defined by a generally vertically disposed intake plate 48. As best shown in FIG. 2, heating chamber 44 is further defined by upper and lower duct plates 50 which are positioned generally above and below intake plate 48.

Air drawn into heating chamber 44 is heated by a heater comprising a burner 52 which extends into the heating chamber. An electric heater can also be readily employed in the present tunnel heater. Burner 52 is preferably gas-fired, and is provided with a generally cylindrical flame tube 54 which extends into heating chamber 44 and within which combustion by the burner 52 takes place. Burner 52 operates to selectively heat air drawn through heating chamber 44 in response to thermostatically-regulated automatic controls, designated generally at 56. Notably, flame tube 54 minimizes direct impingement of heat energy from the burner on blowers 40 disposed immediately downstream of the heating chamber 44. Without flame tube 54, blowers 40 would otherwise tend to suck flames from burner 53 into the blower intakes.

Circulated air heated within heating chamber 44 is drawn into centrifugal blowers 40 through respective blower intakes 58 which define the low pressure or suction side of each blower. The heated, circulating air is blown radially from the blowers 40 in blower chambers 60 within each of blowers 40 is respectively disposed.

The configuration of the blower chambers 60 is significant for providing aerodynamically efficient air flow as the circulating air is ducted from the blowers back to tunnel cavity 28. Each blower chamber 60 is defined by a respective end wall 62, and common top and bottom walls 64 and 66. The blower chambers are further defined by a common rear wall 68 which is spaced inwardly of outer side wall 22 of heater housing 12. In order to minimize heat transfer from the heated circulating air to the heater housing 12, suitable thermal insulation 69 is provided between outer side wall 22 and rear wall 68.

In the presently preferred embodiment, a dividing wall 70 extends vertically from top wall 64 to bottom wall 66 and distinguishes the two blower chambers from each other. Significantly, a plurality of arcuate plate arrangements 72 defines aerodynamically efficient, first and second pairs of generally scroll-shaped air flow passages 73, with each pair of passages in close association with and extending about a respective one of blowers 40. The passages 73 of each pair are generally opposed to each other, with each extending approximately halfway about the respective blower 40. Significantly, the passages 73 of each pair are arranged for opposite blower discharge to substantially equally distribute and duct air from the respective blower 40 to upper and lower sides of tunnel cavity 28 for flow against food products in the cavity. This arrangement for ducting circulating air flow within tunnel heater 10 has been found to promote highly efficient operation, which provides for fast and readily-controllable heating of food products conveyed through tunnel cavity 28.

Air from within the blower chambers 60 is circulated therefrom through upper and lower portions of discharge plate 74 to upper and lower air flow passages 77 and 79 (with blower intakes 58 disposed generally centrally of discharge plate 74). Discharge plate 74 defines a plurality of discharge openings 78, with each discharge opening 78 receiving flow from a respective one of scroll-shaped passages 73. This preferred arrangement of discharge plate 74 cooperates with the scroll-shaped passages 73 so that generally equal portions of the air circulated by each blower 40 are respectively channeled through either one of the upper or lower air flow passages 77 and 79 through which the air circulates. Air flow efficiency is enhanced by the provision of arcuate guides 80 which are positioned generally adjacent rear wall 68, and are arranged to guide the flow of circulating air through discharge plate 74 transversely of the scroll-shaped passages 73 which extend about blowers 40.

As best shown in FIG. 2, the duct work of the present tunnel heater which defines upper and lower air flow passages 77 and 79 provides each of these passages with a venturi-like configuration for directing heated air from the blowers 40 back to the tunnel cavity 28 for heating food products. Upper and lower air flow passages 77 and 79 are respectively defined by upper and lower duct walls 82 and 84, which extend from discharge plate 74 and converge toward the opposite side of the heater housing 12. The upper and lower venturi-like air flow passages 77 and 79 are further defined by duct plates 50 disposed above and below intake plate 48 of heating chamber 44. As will be observed, circulating air within each of the air flow passages 77 and 79 moves through an area of reduced cross-section (in the region of duct plates 50) and then into an area of expanded cross-section in the manner associated with venturi flow characteristics. Notably, arcuate guides 80 within blower chambers 60 act to guide circulating air from the scroll-shaped passages 73 about blowers 40 into the venturi-like air passages 77 and 79 downstream thereof.

In order to direct the flow of heated circulating air against food products conveyed through tunnel cavity 28 on conveyor 30, the present apparatus includes upper and lower foraminous plates 86 and 88. Upper and lower plates 86 and 88 are respectively disposed above and below and adjacent to tunnel cavity 28. Upper plate 86 and lower plate 88 are positioned inwardly of and between upper and lower intake holes 46 and 47 in intake plate 48. Intake holes 46 communicate with cavity 28 on the same side of the upper plate 86 that is associated with air passage 77. Similarly, intake holes 47 communicate with cavity 28 on the same side of the lower plate 88 that is associated with air passage 79.

Upper and lower plates 86 and 88 respectively extend from duct plates 50 to inner wall 90. The inner wall 90 is spaced from the outer side wall 20 of heater housing 12, with suitable thermal insulation provided therebetween for minimizing heat transfer from the heated circulating air to the heater housing. Each plate 86 and 88 is slidably supported by channels 94 and 96 which permit the plates to be easily removed for cleaning or servicing of the tunnel heater.

Figure 3:
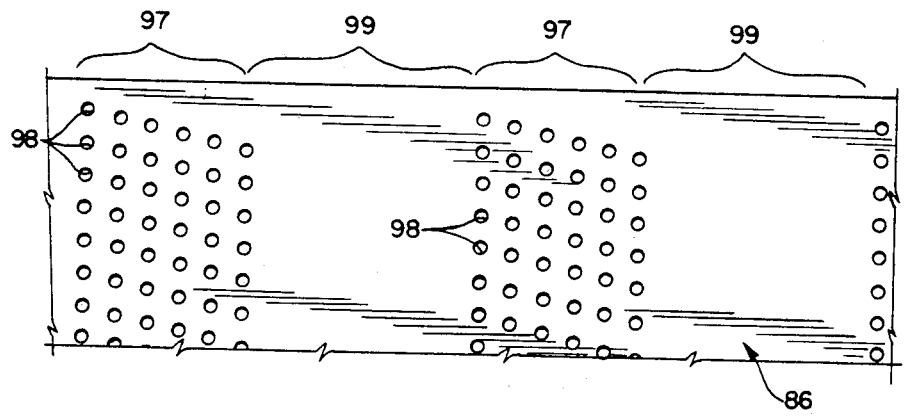
FIG. 3 is a fragmentary plan view taken generally along lines 3'3 of 2.

The configuration of foraminous plates 86 and 88 has been found to be especially effective in promoting controllable convective heating of food products. As best shown in FIG. 3, the preferred configuration of upper plate 86 (as well as lower plate 88 which is of similar construction) includes at least one perforated portion 97, which includes a plurality of relatively closely spaced air passage holes 98, and at least one imperforate portion 99 adjacent perforated portion 97. Preferably, each plate 86 and 88 includes a plurality of respectively vertically aligned perforated and imperforate portions 97 and 99 extending generally transversely to the path of food products conveyed through tunnel cavity 28. In this manner, the food products are conveyed through generally adjacent, non-discrete, alternating zones or areas of relatively high and relatively low convective heating. Passage of food products through high and low heating zones in this manner is desirable since moisture in the food products being heated is permitted to migrate toward the surfaces of the products during passage of the products through the zones of relatively low convective heating. More uniform heating of the products thereby results, providing cooked products having improved quality and appeal. This method of heating food products is particularly effective for heating or baking products having crusts or the like, resulting in products having the desired texture and doneness throughout. Depending upon the type of products to be heated, upper and lower plates 86 and 88 can be made to provide different rates of heating of the upper and lower surfaces of the products by varying the size, number and distribution of holes in the plates.

The relative spacing of food products from the plates 86 and 88 also affects the rate of product heating. Preferably, products are conveyed through cavity 23 so that their surfaces are spaced between approximately one to three inches from the plates 86 and 88. However, relative spacing of conveyed products for optimum results will, of course, depend upon the configuration of plates 86 and 88, the rate and velocity of air flow against and about the products, and the temperature of the circulating air. These design parameters can be varied while still obtaining the desired efficient and readily controlled heating provided by the present apparatus.

In a presently preferred form, each plate 86 and 88 is fabricated from 18 gauge stainless steel and each hole 98 of perforated portions 97 is approximately 5/16 of an inch in diameter. Each perforated portion 97 includes six rows of holes 98 with adjacent holes of each row spaced on approximately ⅜ inch centers. Adjacent rows of holes 98 are staggered with respect to each other by approximately ⅛ inch. While various other perforated configurations for foraminous upper and lower plates 86 and 88 can also be used, this particular sizing and spacing of holes 98 has been found to provide the desired high velocity, blanket-like flow of heated air against food products conveyed through tunnel cavity 28. Further, the ducting of the heated circulating air through the venturi-like upper and lower air flow passages 77 and 79 creates a relative increase in the pressure of the circulated air upstream of upper and lower plates 88 and 86 before the air passes through the plates and is directed against food products for heating. As noted above, the overall arrangement of the aerodynamically efficient duct work of the present tunnel heater greatly promotes efficient heating of food products. Notably, the efficient air flow provided by the present arrangement minimizes heat energy losses by passage of air from the open ends of tunnel cavity 28.

To further enhance the energy efficiency of the present tunnel heater apparatus, the internal duct work of the tunnel heater is supported within the heater housing 12 so that the conductive heat transfer from the heated circulating air to outer portions of the heater housing is minimized. To this end, supports 100 respectively extend between the upper and lower outer walls 16 and 18 of the heater housing 12 and top and bottom walls 64 and 66 about blower chambers 60 within the housing. Each support 100 includes a plurality of spaced holes 102 so that each support 100 includes a portion of reduced cross-section so that conductive heat transfer therethrough is minimized. Similarly, supports 104 are provided extending between end wall 90 and upper and lower outer walls 16 and 18, with supports 104 each defining a plurality of holes 106 for providing each support with a portion of reduced cross-section for minimizing conductive heat transfer therethrough. Significantly, the provision of supports such as 100 and 104, together with suitable thermal insulation, permits the outer surfaces of heater housing 12 to remain relatively cool even though air circulated within the heater may be heated to temperatures on the order of several hundred degrees Fahrenheit.

In one current embodiment of the above-described tunnel heater apparatus, each of two blowers 40 provided in the tunnel heater has a rated air flow capacity of approximately 1250 cubic feet per minute (CFM), with working air flow through each blower being approximately 750 CFM. Upper and lower foraminous in plates 86 and 88 each include two plate sections fitted side-by-side so that generally continuous upper and lower plates 86 and 88 are provided extending substantially the length of tunnel cavity 28. Each plate 86 and 88 includes six spaced perforated portions 97 having holes 98 spaced as described above.

Circulating air is heated by burner 52 having a maximum rated output of approximately 100,000 BTU/hour, with the burner typically operating at a rate of 30,000–50,000 BTU/hour. Circulating air flow velocity within venturi-like air flow passages 77 and 79 reaches approximately 3800–4000 feet/minute through the areas of reduced cross-section, with air velocity decreasing to approximately 1400–1600 feet/minute upstream of foraminous plates 86 and 88. The velocity of air flow against food products in cavity 28 is on the order of approximately 1800–2000 feet/minute. This particular embodiment of the present tunnel heater has proven to provide highly acceptable results for commercial use. However, a wide variety of operating conditions can be readily provided in a heater apparatus made in accordance with the teachings herein.

Figure 7:
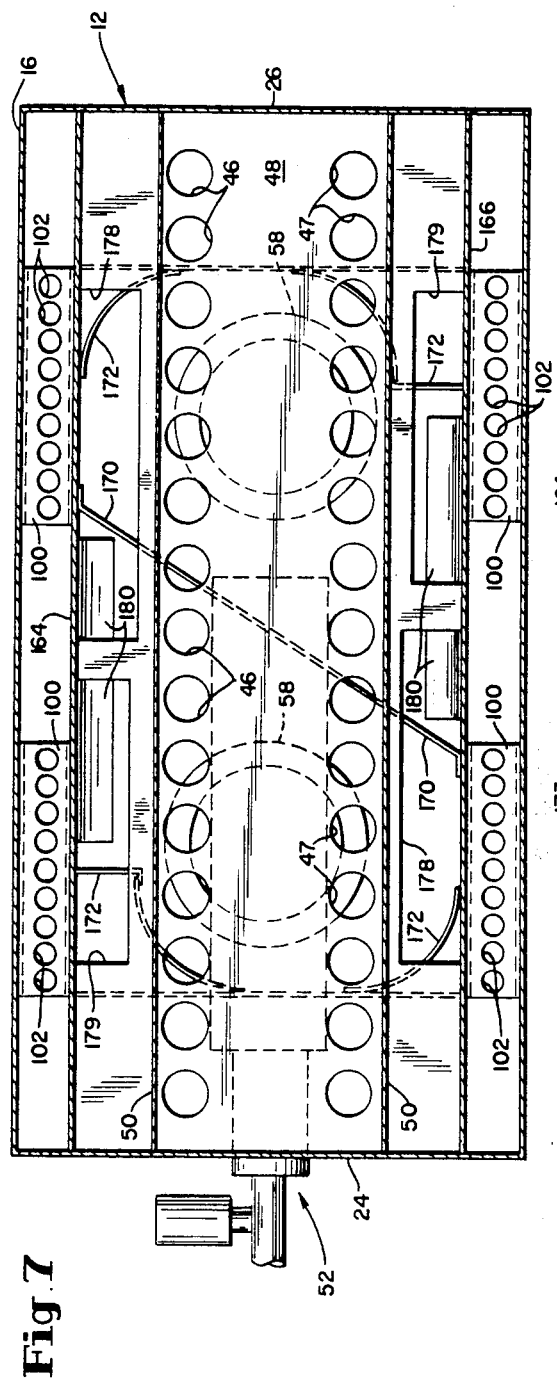
FIG. 7 a view similar to FIG. 5 illustrating an alternate embodiment of the present tunnel heater.
Figure 8:
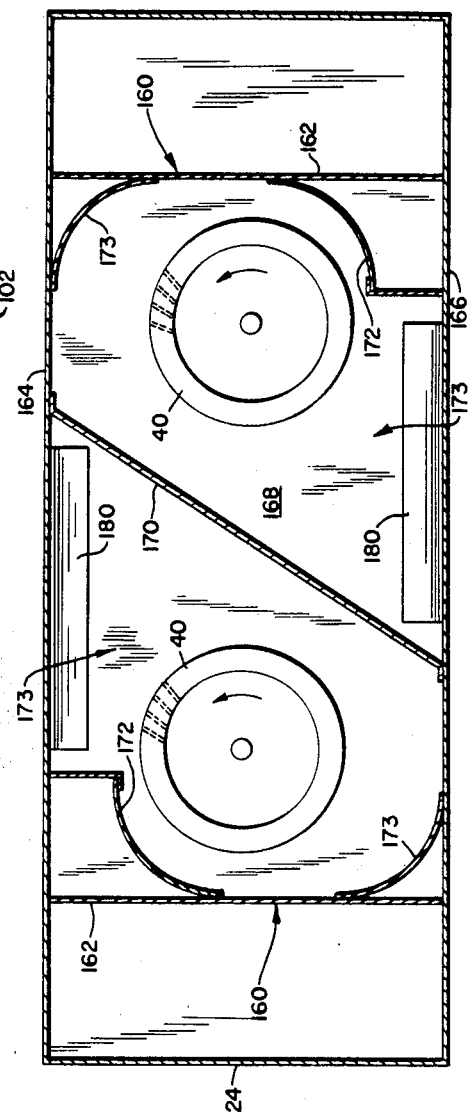
FIG. 8 is a view similar to FIG. 6 further illustrating the alternate of the present invention.

With reference to FIGS. 7 and 8, an alternate embodiment for the circulating air duct work of the present heater is disclosed. This embodiment includes a different arrangement for the chambers within which blowers 40 are positioned which acts to enhance aerodynamically efficient air flow in a manner similar to the arrangement of blower chambers 60.

Circulated air heated within heating chamber 44 is drawn into centrifugal blowers 40 through the respective blower intakes 58, and is blown radially from the blowers in blower chambers 160 within which the blowers 40 are respectively disposed. Each blower chamber 160 is defined by a respective end wall 162, and common top and bottom walls 164 and 166. The blower chambers are further defined by a common rear wall 168 (spaced outwardly of outer side wall 22 of heater housing 12.)

A dividing wall 170 extends angularly from top wall 164 to bottom wall 166 and distinguishes the blower chambers 160 from each other. Significantly, dividing wall 170, together with a plurality of arcuate plate arrangements 172, defines aerodynamically efficient, generally scroll-shaped air flow passages 173 which are closely associated with and respectively extend about the blowers 40. Like the previously described arrangement of blower chamber 60, this arrangement of chambers 160 for ducting circulating air flow has been found to promote highly efficient operation.

Air from within the blower chambers 160 is circulated therefrom through upper and lower portions of discharge plate 174 (positioned within heater 10 like discharge plate 74) to the upper and lower air flow passages 77 and 79. Discharge plate 174 defines discharge openings 178 and 179 through which air circulated by blowers 40 flows. Discharge plate 174 acts in cooperation with blower chamber 160 to baffle air flow from the blowers 40 for distribution to upper and lower air flow passages 77 and 79. If desired, the configuration of discharge plate 174 can be provided so that air flow from each blower 42 is evenly distributed between passages 77 and 79. Alternatively, a predominent portion of the air flow from one of the blowers can be directed to one of passages 77 and 79, with a predominant air flow from the other blower directed to the other of the passages 77 and 79. This latter flow distribution is achieved by sizing and positioning discharge openings 178 and 179 generally as illustrated. Other baffling arrangements can also be used. Air flow efficiency is enhanced by the provision of arcuate air flow guides 130 which are positioned generally adjacent rear wall 168, and are arranged to guide the flow of circulating air through discharge plate 174 transversely of the scroll-shaped passages 173 which respectively extend about each blower 40.

Figure 9:
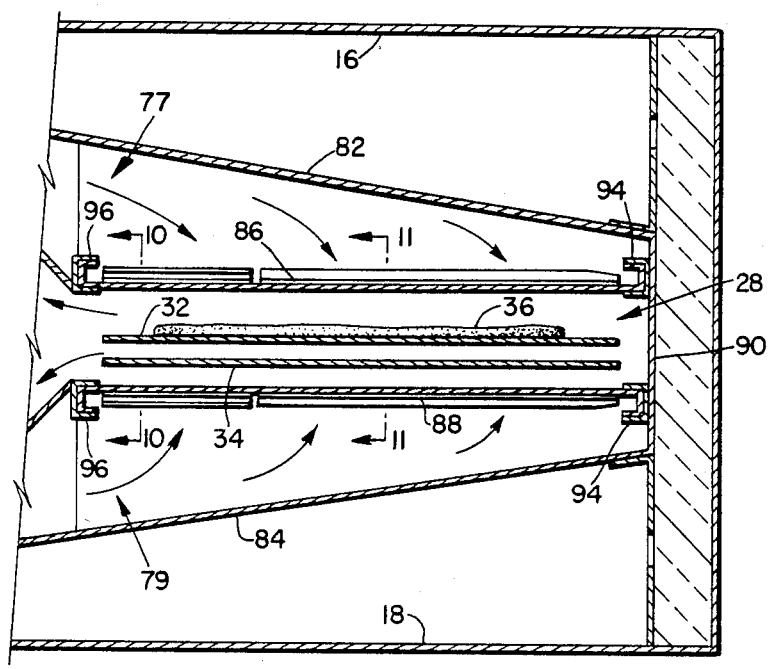
FIG. 9 a fragmentary cross-sectional view similar to FIG. 2.
Figure 10:
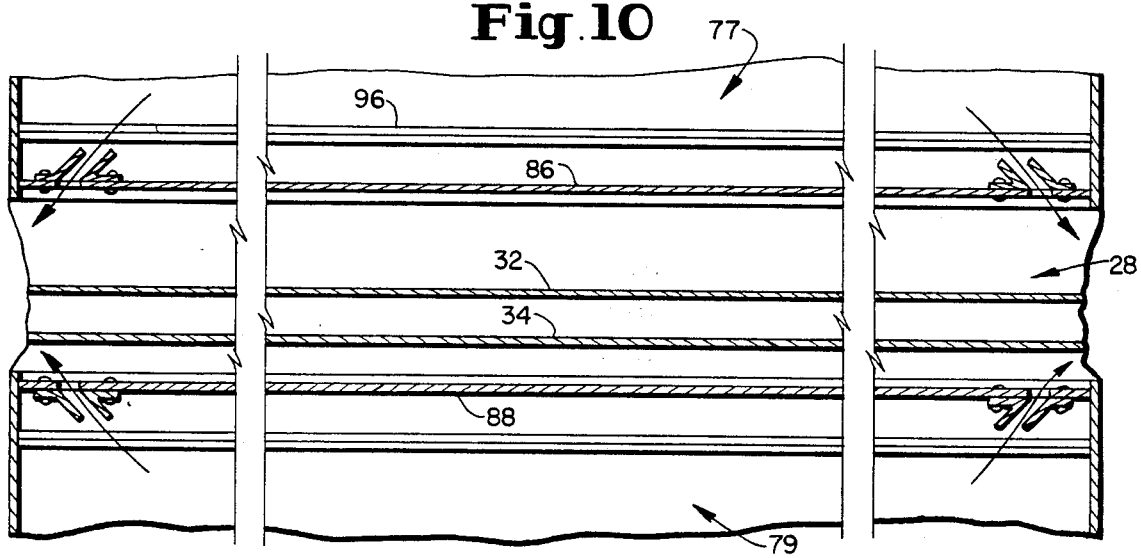
FIG. 10 is a cross-section al view taken along lines 10—10 of FIG. 9.
Figure 11:
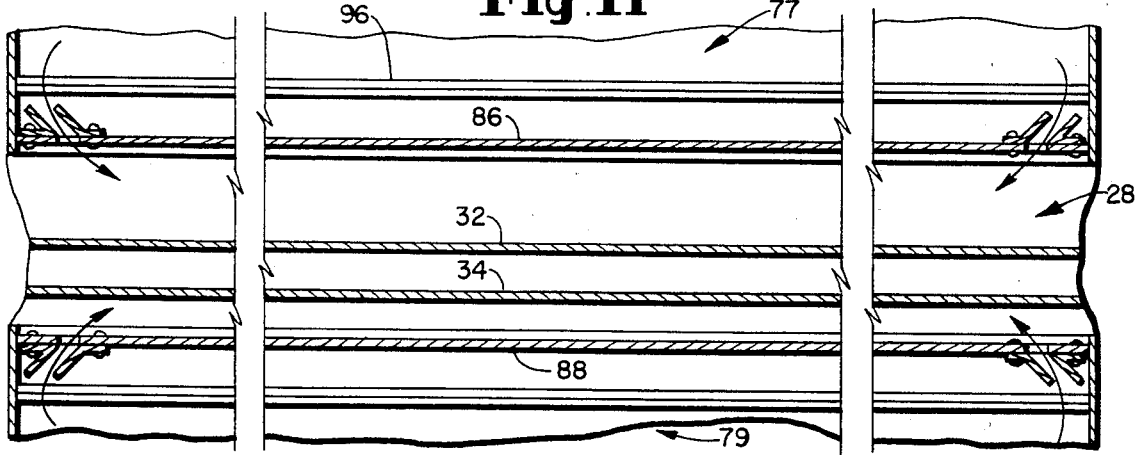
FIG. 11 a cross-sectional view taken along lines 11—11 of FIG. 9.

With attention to FIGS. 9–11, it has been discovered that during operation of the apparatus of this invention cold ambient air tends to enter cavity 28 adjacent the rear portion thereof and heated air tends to be expelled adjacent the front portion at both the inlet opening and the outlet opening where cooked products are discharged. This causes increased fuel consumption and an elevated ambient temperature in the kitchen. In a preferred embodiment, air curtains are utilized to isolate cavity 28 from the ambient environment.

Upper and lower plates 86 and 88 define slots 200 and 202 which extend substantially across the inlet and outlet openings perpendicular to the path of travel of food through cavity 28. Therefore heated air from cavities 77 and 79 not only passes through holes 98 in plates 86 and 88, but through slots 200 and 202.

In order to counteract the tendency of cold air to enter at the back and heated air to exit at the front directional means are provided at slots 200 and 202. Angled extensions 204 and 206 direct the heated air outwardly and inwardly, respectively, to keep the cold air out and retain the heated air in cavity 28. Preferably, extensions 204 and 206 are disposed at angles of 45 degrees and 135 degrees to the planes containing plates 86 and 88.

The use of air curtains then reduces fuel consumption by minimizing cold air entering the heating cavity and reduces ambient air temperature by keeping heated air in the device of this invention. Fuel consumption has been found to be reduced 30% through the use of such air curtains.

Thus, a tunnel heater apparatus is disclosed which greatly facilitates efficient heating and preparation of food products. The present arrangement not only heats food products in a relatively rapid fashion by the use of forced air convection for cooking, but is also energy efficient, with aerodynamically correct air flow passages promoting smooth and efficient circulation of heated air for heating food products.

From the foregoing, it will be observed that numerous variations and modifications may be effected without departing from the true spirit and scope of the novel concept of the invention. It will be understood that no limitation with respect to the specific apparatus illustrated herein is intended or should be inferred. It is, of course, intended to cover by the appended claims all such modifications as fall within the scope of the claims.

what is claimed is:

1. An apparatus for heating food products by convection, comprising:
   a housing having a tunnel-like cavity adapted to receive said food products and an inlet and outlet thereto;
   means for conveying said food products through said cavity;
   foraminous plate means disposed above and below said cavity;
   blower means for circulating air drawn from said cavity through said plate means and against said food products;
   heating means for selectively heating said circulating air; and aerodynamically efficient duct means for guiding air flow from said blower means to said plate means, said duct means defining scroll-shaped passage means associated with said blower means, and venturi means disposed downstream of said passage means and upstream of said plate means for creating a relative increase in the pressure of the circulated air before passage through said plate means for heating said food products;
   said scross-shaped passage means comprising a pair of scroll-shaped passages associated with said blower means arranged to respectively duct circulated air above and below said cavity for passage through said plate means, and
   air curtain means associated with said blower means and heating means for directing a curtain of heated air across the inlet and outlet to said cavity.

2. The apparatus in accordance with claim 1, wherein said foraminous plate means includes at least one perforated portion having a plurality of holes through which circulated air passes, and at least one imperforate portion adjacent the perforated portion so that food products heated by said apparatus are conveyed through zones of relatively high and relatively low convective heating.

3. The apparatus in accordance with claim 1, wherein said blower means comprises a centrifugal blower about which said scroll-shaped passage means extend, and said heating means comprise a heater disposed intermediate said cavity and the intake side of said centrifugal blower.

4. The apparatus in accordance with claim 3, and duct supporting means for supporting said duct means within said housing including portions of reduced cross-section for minimizing conductive heat transfer from said duct means to outer portions of said housing.

5. The apparatus in accordance with claim 3, wherein said foraminous plate means comprise upper and lower relatively thin, flat plates each having a plurality of holes arranged to direct circulated air against food products conveyed through said cavity.

6. The apparatus in accordance with claim 1, wherein said blower means comrise a pair of centrifugal blowers, and said scroll-shaped passage means includes first and second pairs of scross-shaped passages, each pair of passages respectively extending about one of said blowers,
   said foraminous plate means comprising upper and lower, relatively thin flat plates each having a plurality of holes, said venturi means including upper and lower venturi-like passages respectively disposed upstream of said upper and lower plates,
   each said pair of scroll-shaped passages being arranged to duct generally equal amounts of circulated air through said upper and lower passages from the one of said blowers respectively associated with each pair of scroll-shaped passages.

7. The apparatus in accordance with claims 3 or 4, wherein said heating means comprises a heater disposed intermediate said cavity and the intake side of said blower, and includes means for minimizing direct impingement of heat energy from said heater on said blower.

8. The apparatus in accordance with claim 7, wherein said heater comprises a fuel-fired burner and said minimizing means comprises a flame tube within which combustion by said burner takes place.

9. A method heating food products by convection, comprising:

providing a housing having a cavity adapted to receive said food products and an inlet and outlet thereto;

conveying said food products through said cavity;

positioning upper and lower formaninous plates respectively above and below the products conveyed through said cavity;

circulating air within said housing with blower means by drawing air from within said cavity and directing the circulated air through said upper and lower plates against said food products;

selectively heating the circulated air; and aerodynamically enhancing the flow of the circulated air from said blower means to said upper and lower plates by positioning generally scroll-shaped passage means in close association with said blower means, and by providing venturi means downstream of said scroll-shaped passage means for creating a relative increase in the pressure of the circulated air before passage through said upper and lower plates whereby selectively heated air is directed against said food products for heating the food products;

said scroll-shaped passage means are provided by providing a pair of generally scroll-shaped passages in close association with said blower means to respectively duct air circulated by said blower means through said upper and lower plates, and directing a curtain of heated air from said blower means across the inlet and outlet whereby the intake of ambient air and the loss of heated air from the cavity is minimized.

10. The method of heating food products in accordance with claim 9, wherein said food products are conveyed through zones of relatively high and relatively low convective heating.

11. The method of heating food products in accordance with claim 9, and minimizing conductive heat transfer from the circulated air to outer portions of said housing by supporting air flow passages within said housing with supports including portions of reduced cross-section.

* * * * *